United States Patent [19]

Millard

[11] Patent Number: 6,000,032
[45] Date of Patent: Dec. 7, 1999

[54] SECURE ACCESS TO SOFTWARE MODULES

[75] Inventor: John Millard, Los Angeles, Calif.

[73] Assignee: Symantec Corporation, Cupertino, Calif.

[21] Appl. No.: 08/893,934

[22] Filed: Jul. 15, 1997

[51] Int. Cl.$^6$ ........................................... H04L 9/00
[52] U.S. Cl. ............................. 713/201; 380/25
[58] Field of Search ..................... 713/200–201, 713/202; 380/3, 4, 23–25

[56] References Cited

U.S. PATENT DOCUMENTS

| | | | |
|---|---|---|---|
| 4,766,537 | 8/1988 | Zolnowsky | 364/200 |
| 4,888,798 | 12/1989 | Earnest | 380/4 |
| 5,103,476 | 4/1992 | Waite et al. | 380/4 |
| 5,182,770 | 1/1993 | Medveczky et al. | 380/4 |
| 5,432,851 | 7/1995 | Scheidt et al. | 380/25 |

FOREIGN PATENT DOCUMENTS

| | | | |
|---|---|---|---|
| 0 570 123 A1 | 11/1993 | European Pat. Off. | G06F 12/14 |
| 0 717 337 A1 | 6/1996 | European Pat. Off. | G06F 1/00 |
| 0 770 957 A2 | 5/1997 | European Pat. Off. | G06F 9/445 |

OTHER PUBLICATIONS

McNamara, John E., *Technical Aspects of Data Communication*, 2$^{nd}$ Ed. 1982, Digital Equipment Corporation, U.S.A., pp. 110–122.

Ore, Oystein, *Number Theory and Its History*, 1976, Gudrun Ore, U.S.A., pp. 124–129.

*Primary Examiner*—Robert W. Beausoliel, Jr.
*Assistant Examiner*—Scott T. Baderman
*Attorney, Agent, or Firm*—Fenwick & West LLP

[57] ABSTRACT

Apparatus and method for obtaining a security value (50) that enables a calling module (7) to achieve secure access to a called module (5) within a digital computer (1). A distributive invertible function f is selected. f may be the cyclic redundancy check function modulo p, where p is a prime number. A desired residual value r associated with the application of f and a desired size of the security value (50) are also selected. Space is allocated within the called module (5) for storing the security value (50). A portion of the called module (5) is designated as a test block (51). f is applied to a numerical representation of test block (51) to generate a first challenge value CV1. f is applied to a numerical value of the security value (50) and a number representative of the location of the security value (50) within the called module (5) to calculate a second challenge value CV2. n is the number of bits from the beginning of the security value (50) to the end of the called module (5). CV1 and CV2 are typically calculated by called module (5). Calling module (7) then calculates the security value (50) based upon CV1 and CV2, and using f. Called module (5) uses this calculated value of the security value (50) in function f. If this application of f provides the desired residual value r, then it is known that calling module (7) had proper access to called module (5). At this point, one or more functions accessible by called module (5) may be activated. Access codes may be coded within residual value r itself.

13 Claims, 4 Drawing Sheets

SECURE ACCESS TO SOFTWARE MODULES

TECHNICAL FIELD

This invention pertains to the field of enabling a calling module to obtain secure access to a called module within a digital computer. The calling module and the called module can be fabricated of hardware, firmware, or software, but are typically software modules.

BACKGROUND ART

McNamara, John E., *Technical Aspects of Data Communication*, 2nd Ed. 1982, Digital Equipment Corporation, U.S.A., pp. 110–122, describes a Cyclic Redundancy Check (CRC) function that is useful in the present invention, as described below.

Ore, Oystein, *Number Theory and Its History*, 1976, Gudrun Ore, U.S.A., pp. 124–129, gives a general introduction to number theory, which provides the mathematical underpinnings of the present invention.

DISCLOSURE OF INVENTION

Apparatus and computer-implemented method for obtaining a security value (50) that enables a calling module (7) to achieve secure access to a called module (5) within a digital computer (1). A desired size of the security value (50) is selected. A distributive invertible function f is selected. A desired residual value r associated with the application of f is selected. Space is allocated within the called module (5) for storing the security value (50). A portion of the called module (5) is designated as a test block (51). f is applied to a numerical representation N of the test block (51) to calculate a first challenge value CV1. f is applied to a numerical value of the security value (50), and to a number n representative of the location of the security value (50) within the called module (5), to calculate a second challenge value CV2. Finally, the security value (50) is calculated based upon CV1 and CV2, and using f.

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF THE PREFERRED EMBODIMENTS

Figure 1:
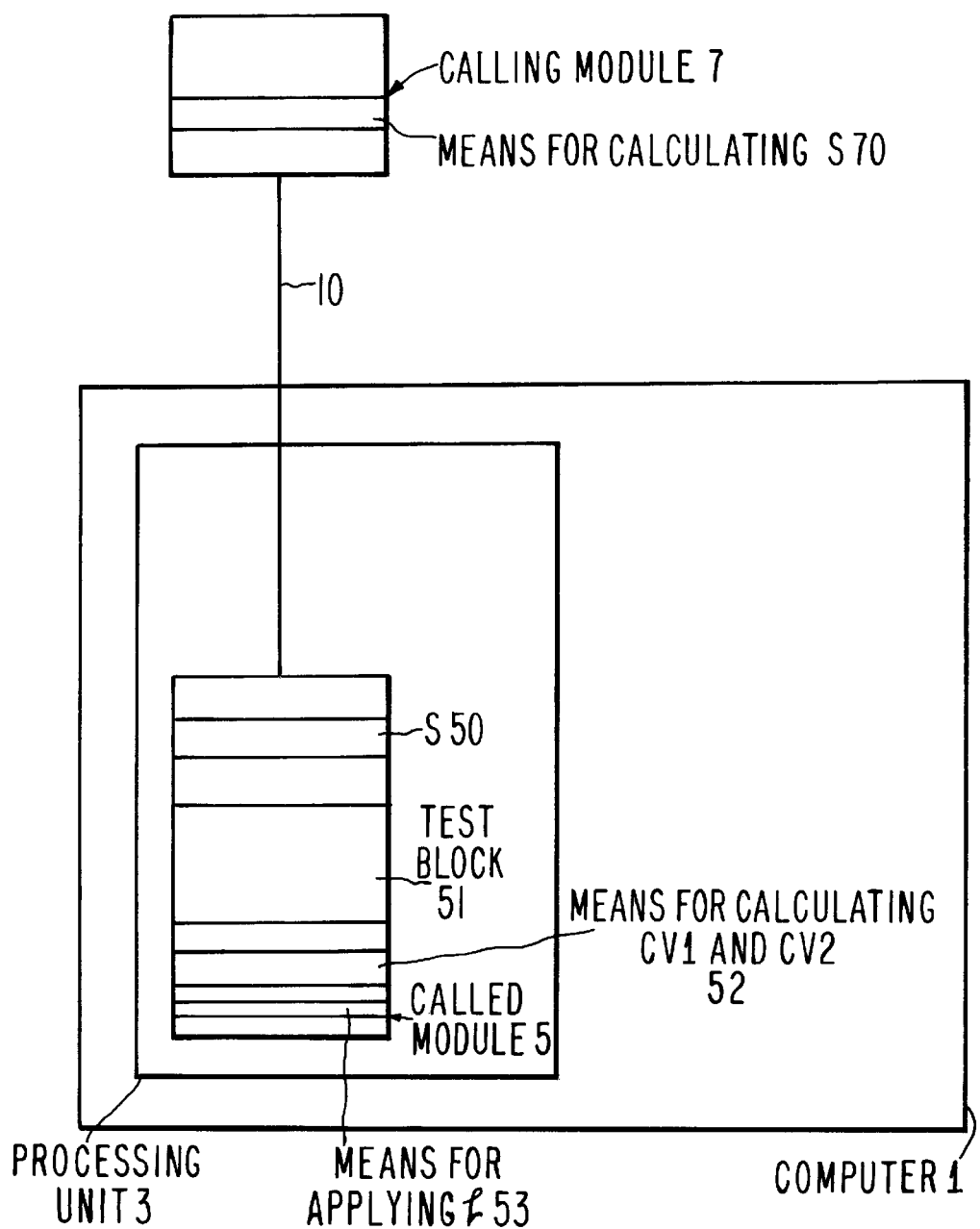
FIG. 1 is a block diagram of a computer (1), called module (5), and calling module (7) implementing the present invention.

Called module 5 is any executable module. It can be implemented in hardware, firmware, or software. It is typically located within the processing unit 3 or memory of a digital computer 1. For example, called module 5 may be a device driver or a TSR (Terminate and Stay Resident) software module that loads into the memory portion of computer 1 every time the human operator decides to operate computer 1.

Similarly, calling module 7 is any executable module. It may be implemented in hardware, firmware, or software. It can be located within the same computer 1 as called module 5, or it may be coupled to computer 1 by a network or other connecting means 10.

The problem that the present invention solves is that in many computer 1 installations, it is desired to activate called module 5 only when certain safeguards have been observed. This is to protect the operations of called module 5 from unauthorized access by assorted hackers, crackers, lowlifes, and criminals. Thus, it is highly convenient at many computer 1 installations for someone having known trustworthiness, and who controls a calling module 7, to be able to have access to called module 5 only upon the performance of a security check that entails the creation and passage of a security value S. Security value S is referred to in the Figures as item 50.

Figure 3:
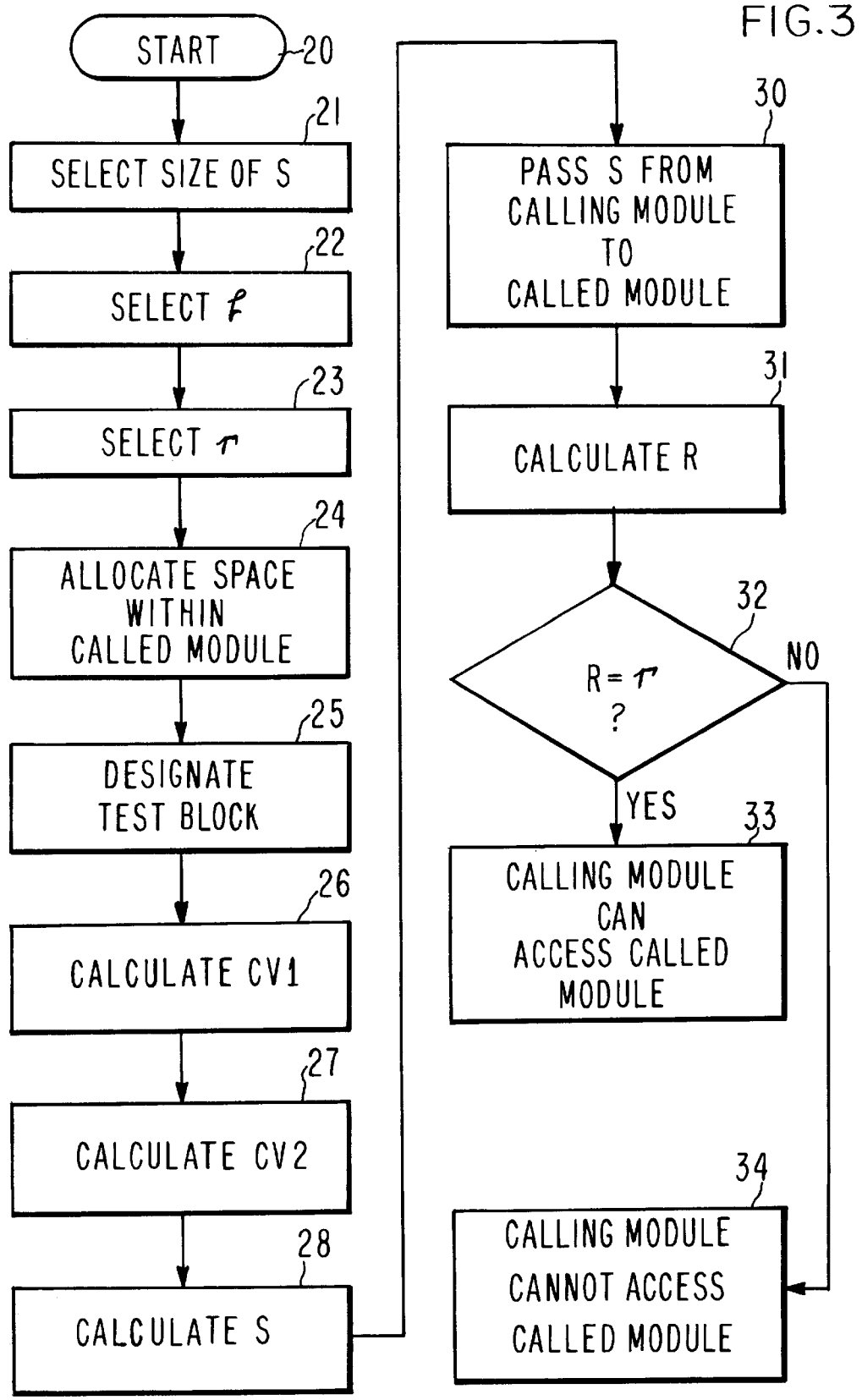
FIG. 3 is a flowchart diagram illustrating the method of the present invention.

According to the method of the present invention, a desired size of the security value 50 is selected. This is shown in step 21 in FIG. 3, following the decision to start the security access process at step 20. S is typically 32 or 64 bits long. Generally speaking, the larger the size of S, the harder it is for an unauthorized person to perform a brute force search to ascertain its identity.

Next (see step 22 in FIG. 3), a distributive invertible function f is selected. f can be any distributive invertible function. As used in this specification and claims, distributiveness pertains to additive distributiveness. Thus, a function f that is additive distributive is one that satisfies the equation:

$$f(N)+f(S)=f(N+S)$$

where N and S are any variables.

As used in this specification and claims, an invertible function f(N,S)=r is a function where, given r and given N, one can calculate S. r is the residual value that results when f is applied to N and S.

An example of a distributive invertible function that is useful in the present invention is the Cyclic Redundancy Check (CRC) function that is described in the McNamara reference cited above. This CRC function is the modulo p function, where p is somewhat loosely referred to as a "polynomial". The division by p is performed over a Galois field to expedite the calculations. The CRC function is an excellent choice for use in the present invention, because it is not obvious that it is an invertible function; and, even if one does realize that it is an invertible function, it is not obvious how to invert it.

For the CRC function generally, $(N+(S)2^n) \bmod(p)=r$. In this case, the residual value r is the remainder that is left over after the division by p. For the purposes of this invention, the quotient is irrelevant and is discarded.

For a CRC function generally, p is not normally a prime number, because it is desired to obtain a gratuitous parity check along with the calculation of modulo p. In the present invention, on the other hand, we do want p to be a prime number. p is selected to be one bit longer than the size of S. The first and last bits of p must be a 1. The first bit of p must be a 1 so as to preserve the desired length of p. The last bit of p must be a 1 to guarantee that p really is a prime number. p can be any random prime number satisfying these criteria.

Next, in step 23 (see FIG. 3), r is selected and stored within called module 5. r is the residual value that one obtains following the application of f. For the case where f is the CRC function, r is the remainder after the starting variables are taken modulo p.

Next, in step 24, space is allocated within called module 5 to store S. Placing the security value 50 somewhere in the middle of the called module 5 makes it harder for an unauthorized person to detect the presence of the security value 50. Placing the security value 50 at the beginning of the called module 5 makes it easier to code, in the case where called module 5 is a software module. Placing the security value 50 at the end of the called module 5 is not desirable, because it weakens security.

Next, at step 25 (see FIG. 3), a test block 51 is designated to be part of called module 5. The size of test block 51 does not matter. It could be, for example, 100 words long. Test block 51 is preferably something that changes its contents every time that called module 5 is loaded into the computer 1, but does not change for the duration of each load. This can be achieved by placing something known to be changeable, like the current time, into test block 51. The reason for this is to guarantee that security value 50 will change each instance that called module 5 is loaded into computer 1. This greatly enhances the security of the overall system. If there were no change within test block 51, security value 50 would be the same for each load of called module 5.

Figure 2A:
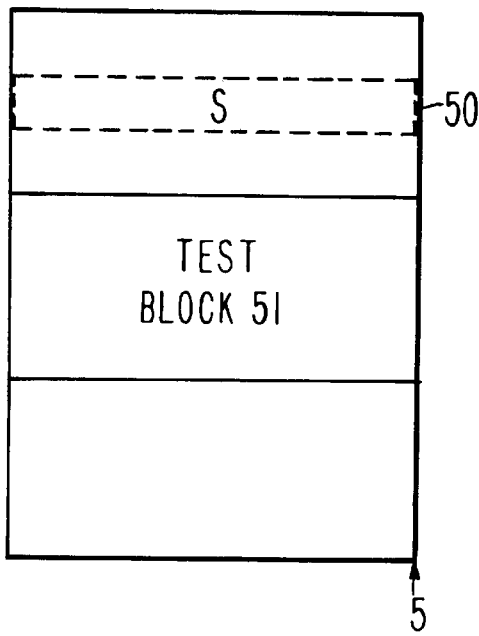
FIGS. 2A, 2B, 2C, and 2D are four block diagrams illustrating four embodiments of the placement of the security value (50) and the testblock (51) within the called module (5).
Figure 2B:
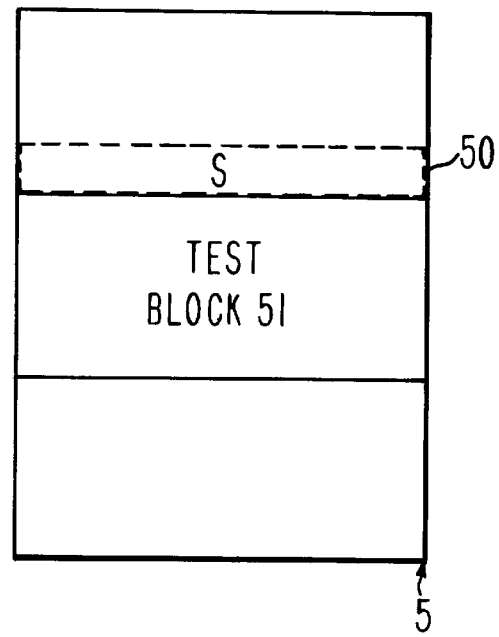
Figure 2C:
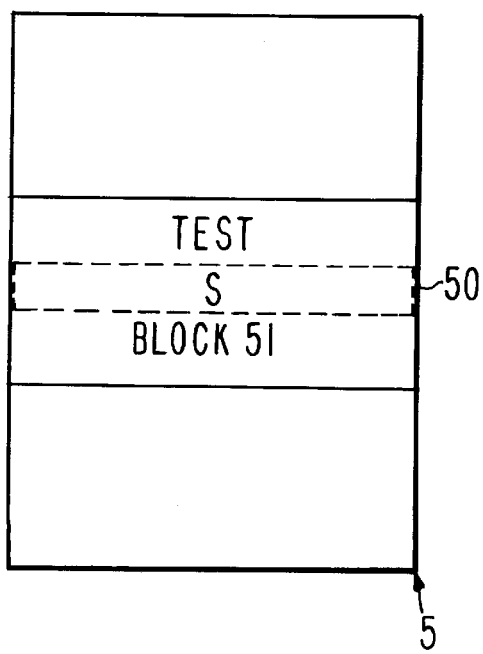
Figure 2D:
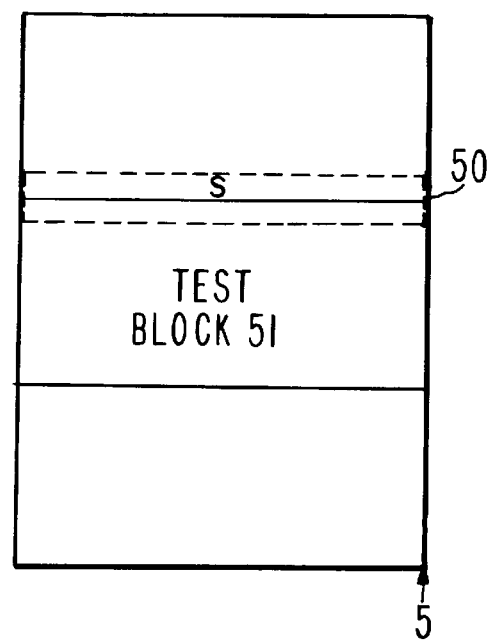

The location of security value 50 and test block 51 within called module 5 can have four embodiments, as illustrated in FIGS. 2A–2D, respectively. In FIG. 2A, security value 50 and test block 51 are noncontiguous. In FIG. 2B, security value 50 and test block 51 abut each other. In FIG. 2C, security value 50 is located entirely within test block 51. In FIG. 2D, security value 50 partially overlaps with test block 51. All four embodiments are usable in the present invention.

In step 26 (FIG. 3), called module 5 calculates a first challenge value CV1. CV1 is calculated by submodule 52 within called module 5 by means of invoking submodule 53 to apply function f to a numerical representation N of the contents of test block 51. In the case where function f is the CRC function known as modulo p, $CV1=(N) \bmod(p)$.

Next, in step 27 (FIG. 3), submodule 52 within called module 5 calculates a second challenge value CV2 by means of invoking submodule 53 to apply f to a numerical value representative of the contents of S and to a numerical representation n of the location of S within called module 5. When f is the CRC function known as modulo p, $CV2=((S)2^n) \bmod(p)$.

Next, in step 28, an initial security check is performed by submodule 70 within calling module 7: submodule 70 calculates the security value 50.

Now, let us assume that calling module 7 wants to obtain secure access to called module 5. In step 30, S is passed from calling module 7 to called module 30, e.g., over connection 10. In step 31, called module 5 uses the value of S passed to it from calling module 7 to calculate R, a residual value obtained by applying function f to CV1 and CV2. R is called the test residual value. For the case where function f is the CRC function known as modulo p, $R=(N+(S)2^n) \bmod(p)$.

Referring to step 32, called module 5 invokes a compare step to compare the newly calculated R with the prestored r. When R=r, it is known that the calling module 7 did have correct access to the called module 5, and processing continues at step 33. This is so because when R=r, it is known that the S that was used in the application of function f is the correct S that will give the desired residual value r. In this case, called module 5, at step 33, declares that calling module 7 has proper access to called module 5, and allows such access to take place. When R does not equal r, it is known that the calling module 7 does not have proper authority to access called module 5, and step 34 is invoked. Step 34 can trigger certain actions, e.g., alerting security personnel, sending an error message, etc.

Every time the contents of test block 51 change, security value 50 has to be recalculated. This feature greatly enhances the security of the overall system.

Normally, calling module 7 and called module 5 both store p and the size of S. Alternatively, and to make the system more flexible, called module 5 could be programmed to pass p and/or the size of S to calling module 7. In either case, the size of S is implied from the size of p, because the size of S is one bit less than the size of p.

MD5 or another cryptographic hash function cannot be used for the purposes of this invention because hash functions are not invertible functions. The present invention does not use encryption.

It will be appreciated from the above description that the present invention offers many significant and valuable features and advantages. The invention allows a device driver, TSR, or any other called module 5 to authenticate a calling program 7 before allowing the calling program 7 to modify security features of the called module 5, or to do anything else with the called module 5.

Furthermore, this is done in a way that is not easily reversed engineered or described to persons wishing to control the called module 5 in an unauthorized way. The security value 50 can be made to change each time the called module 5 is reloaded, further enhancing security. There is no code in the called module 5 that does the calculation of the needed security value 50. The security check is done with a fast, straightforward calculation, such as an ordinary CRC calculation.

In one application of the present invention to a real-world scenario, called module 5 is under the control of a customer at a customer site. Called module 5 may be one of many called modules 5 in the hands of many customers, all at different locations. Calling module 7 is controlled by a Security Enabler, an individual who has the ability to enable certain powers within one or more called modules 5. These powers can include permitting a called module 5 to function for a longer period of time than originally established by the purchase agreement, permitting a called module 5 to access a hidden feature within computer 1 or the overall network, and permitting a called module 5 to operate on a processing unit other than processing unit 3 or on a computer other than computer 1. Such a power can be any power that the Security Enabler desires to control at the customer site.

Figure 4:
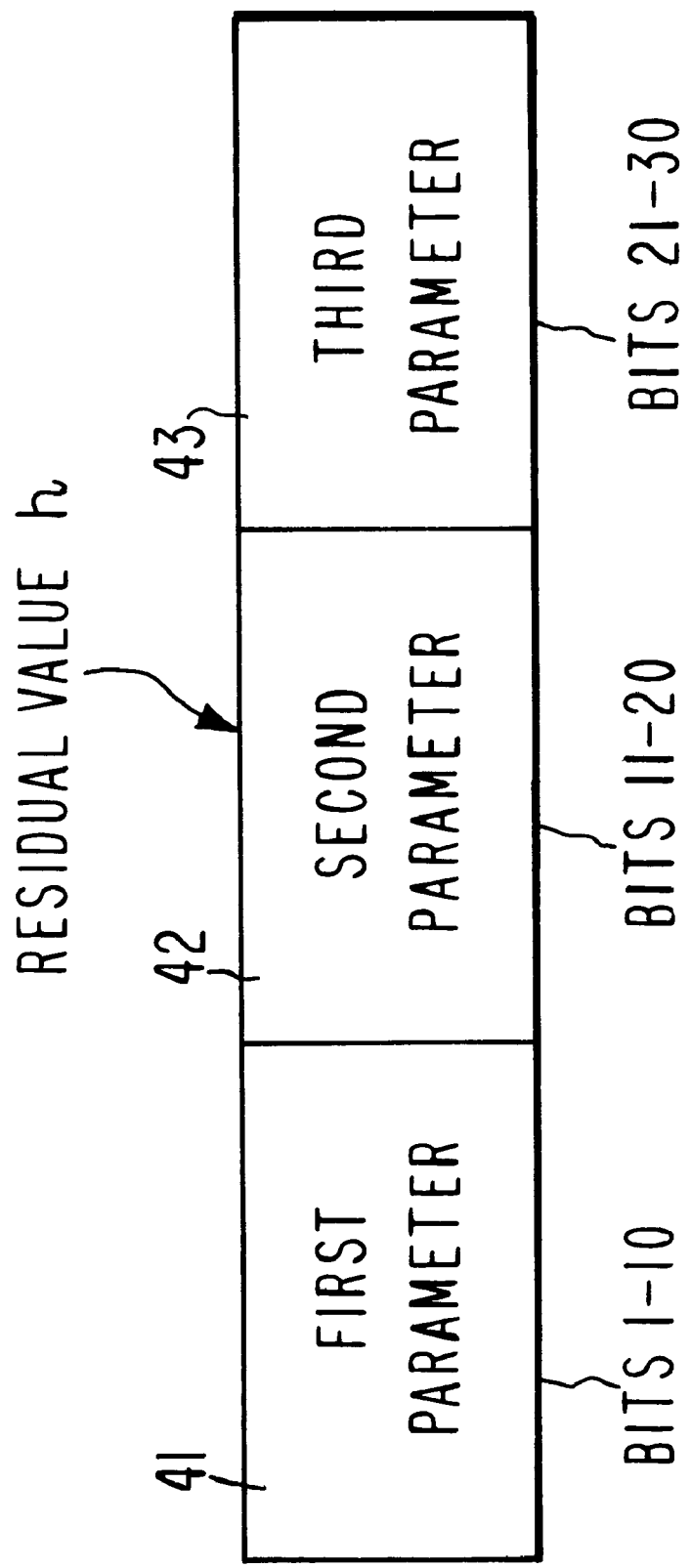
FIG. 4 is a bitmap of a possible residual value r useful in the present invention.

In this embodiment, the desired residual value r can be predesigned to be a field that intentionally includes preselected control parameters representing the desired powers, as illustrated in FIG. 4. For example, r can have three subfields representing first, second, and third parameters 41, 42, 43, respectively, each 10 bits long. First parameter 41 can be coded with informational content indicating whether called module 5 is permitted to function for a longer period of time than originally authorized, and, if so, for what additional period of time. Similarly, second parameter 42 can be coded to indicate whether called module 5 can access hidden features, and if so, which hidden features. Third parameter 42 can indicate whether called module 5 is permitted to operate on an additional processing unit 3 or computer 1, and if so, on which processing units or computers.

Generally speaking, the size of r must be big enough to accommodate the preselected control parameters 41, 42, 43. It is also generally true that, in general, the larger the size of r, the more difficult it is for an unauthorized person to tamper with the security features of the system.

In one embodiment, the called module 5 at the customer site presents the challenge values CV1 and CV2 to the Security Enabler by any means, e.g., over network connection 10. Some of this presentation can be done in advance of the activation of the discretionary powers. All copies of a certain mass-marketed computer software product can have challenge values that are known to the Security Enabler. For example, CV1 can be known for all copies of the software program. Then other challenge values can be calculated at the moment of activation of the discretionary powers. For example, CV2 for each copy of the software program can be calculated each time the date changes to the first of the month, or at some other occurrence, such as the customer paying more money to the software purveyor/Security Enabler.

At the time of activation of the discretionary powers, the Security Enabler passes the security value 50 to the called modules 5 at the customer sites. This does not have to be done over a computer link 10, but can be conveyed to the customers over the public switched telephone network (PSTN), via e-mail, etc. This can be done, for example, whenever the customer in the field who controls called module 5 has paid additional sums of money to the Security Enabler, so as to warrant giving additional privileges to that particular customer.

The customer in the field then takes the security value 50 and invokes submodule 53 to apply function f and thereby calculate test residual value R. As before, when R=r, it is known that the proffered security value 50 was the legitimate one, and, for this embodiment, r automatically has informational content containing parameters 41, 42, 43 giving the correct authorization codes.

It will be appreciated from the above description that the embodiment described above offers significant and valuable features and advantages. Said embodiment allows encoding of arbitrary parametric information for expanding the evaluation time of a product 5 or unlocking certain features of the product 5. The features can be unlocked jointly, or one by one. The security value 50 can be made to work with just one product 5 or for an entire class of products 5. The decoding of the security value 50 depends upon the contents of the product 5. Reverse-engineering the decode function does not directly help with determining the security value 50 given to the product 5. An unauthorized person having access to just the executable module 5 might determine the identity of the function f being used but still wouldn't know the correct value of the security value 50 to make said function operational. The executable module 5 contains no code indicating how to calculate the security value 50.

The method steps of the present invention can be embodied in a computer program stored on a computer-readable medium such as a floppy disk, hard disk, CD-ROM, memory, etc.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. A computer-implemented method for enabling a calling module to achieve secure access to a called module within a digital computer, said method comprising the steps of:

selecting a desired size of S;

selecting a distributive invertible function f;

selecting a desired residual value r associated with the application of f;

allocating a space within the called module for storing S;

designating a portion of the called module as a test block TB;

causing the called module to apply f to a numerical representation N of the TB, to calculate a first challenge value CV1;

causing the called module to apply f to a numerical value of S and to a number n representative of the location of S within the called module, to calculate a second challenge value CV2;

causing the calling module to calculate S based upon CV1 and CV2, and using f;

having the calling module pass the calculated S to the called module;

having the called module apply f to a number representative of the contents and location of the calculated S and the contents of TB, resulting in the calculation of a test residual value R; and when R=r, having the called module declare that the calling module has proper authority to access the called module.

2. The method of claim 1, wherein the function f is of the form $f(N+(S)2^n)=r$, where n is the distance in bits from the beginning of S to the end of the called module.

3. The method of claim 1, wherein f is the cyclic redundancy check function known as modulo p, p being a "polynomial".

4. The method of claim 3, wherein p is a prime number.

5. The method of claim 4, wherein the length of p is one bit greater than the length of S.

6. The method of claim 1, wherein the contents of the test block change each time the called module is loaded into the computer.

7. The method of claim 1, wherein r is large enough to accommodate preselected control parameters conveying informational content.

8. The method of claim 7, wherein the control parameters are from a group of parameters comprising a parameter permitting the called module to function for a longer period of time, a parameter allowing the called module to access a hidden feature, and a parameter permitting the called module to operate on an additional processing unit.

9. The method of claim 7, wherein the calling module is at a central location; and the called module is one of a plurality of called modules at locations remote from the central location.

10. The method of claim 9, wherein the calling module is controlled by a purveyor of the called modules; and the called modules are under the aegis of customers of the purveyor.

11. Apparatus for enabling a calling module to obtain secure access to a called module located within a computer, the apparatus comprising:

a test block TB located within the called module;

a security value S located within the called module;

situated within the called module, means for applying a distributive invertible function f to a numerical representation N of the TB, to calculate a first challenge value CV1;

situated within the called module, means for applying f to a block within the called module representative of the contents and location of S within the called module, to calculate a second challenge value CV2;

located within the calling module, means for calculating S based upon CV1 and CV2, and using f; and means for allowing the calling module to have access to the called module when the calculated S corresponds to the security value S located within the called module.

12. A computer-implemented method for enabling a calling module to obtain secure access to a called module located within a computer, the method comprising the steps of:

forming a test block TB located within the called module;

locating a security value S within the called module;

having the called module apply a distributive invertible function f to a numerical representation N of the TB, to calculate a first challenge value CV1;

having the called module apply f to a block within the called module representative of the contents and location of S within the called module, to calculate a second challenge value CV2;

having the calling module calculate S based upon CV1 and CV2, and using f; and granting the calling module access to the called module when the calculated S corresponds to the security value S stored within the called module.

13. A computer-readable medium containing a software program that includes instructions for performing the method in claim 12.

* * * * *